No. 680,824. Patented Aug. 20, 1901.
G. WESTINGHOUSE.
CONTACT DEVICE FOR ELECTRIC RAILWAYS.
(Application filed Feb. 28, 1896.)
(No Model.) 4 Sheets—Sheet 3.
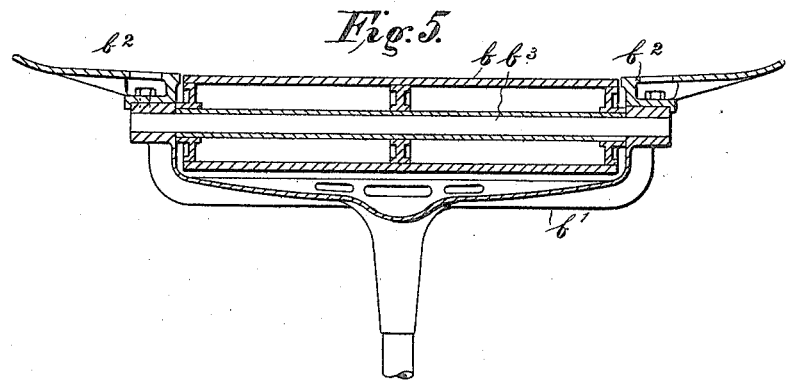
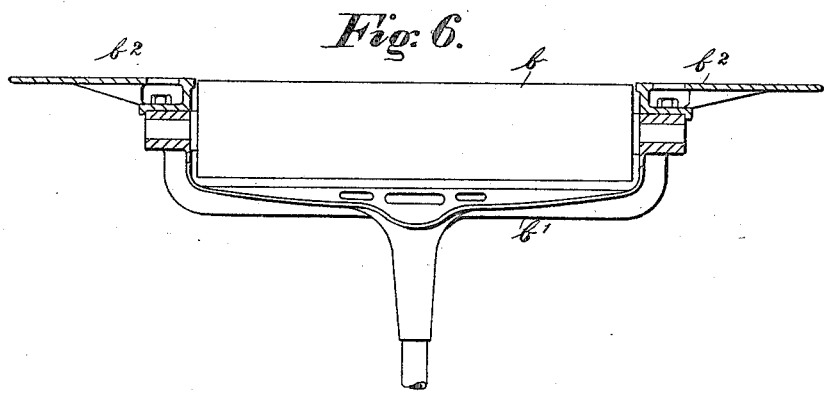
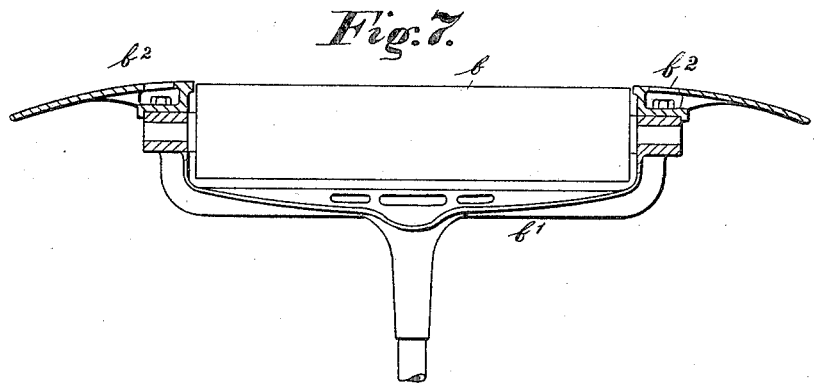
WITNESSES:
INVENTOR
BY
ATTORNEY.

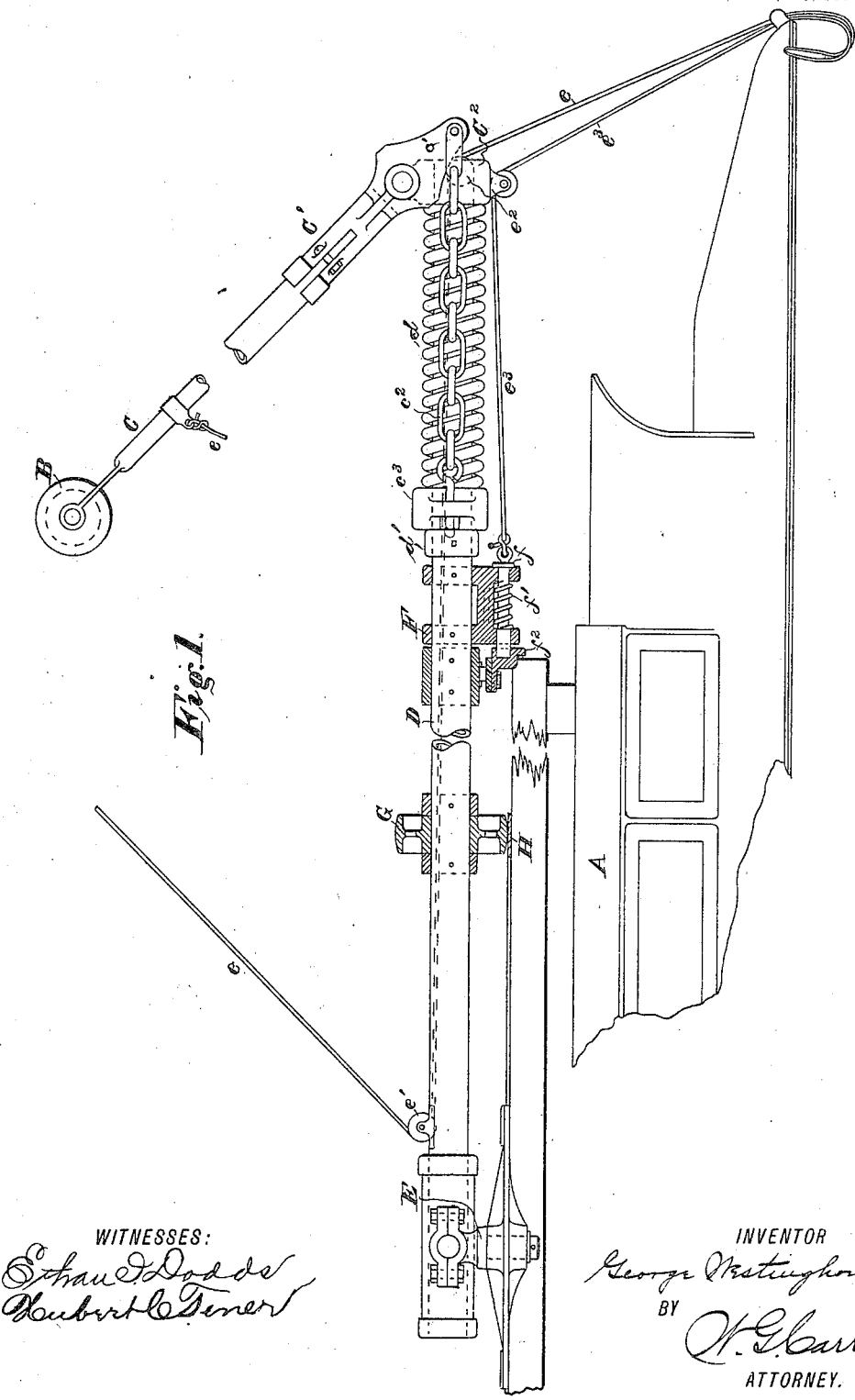

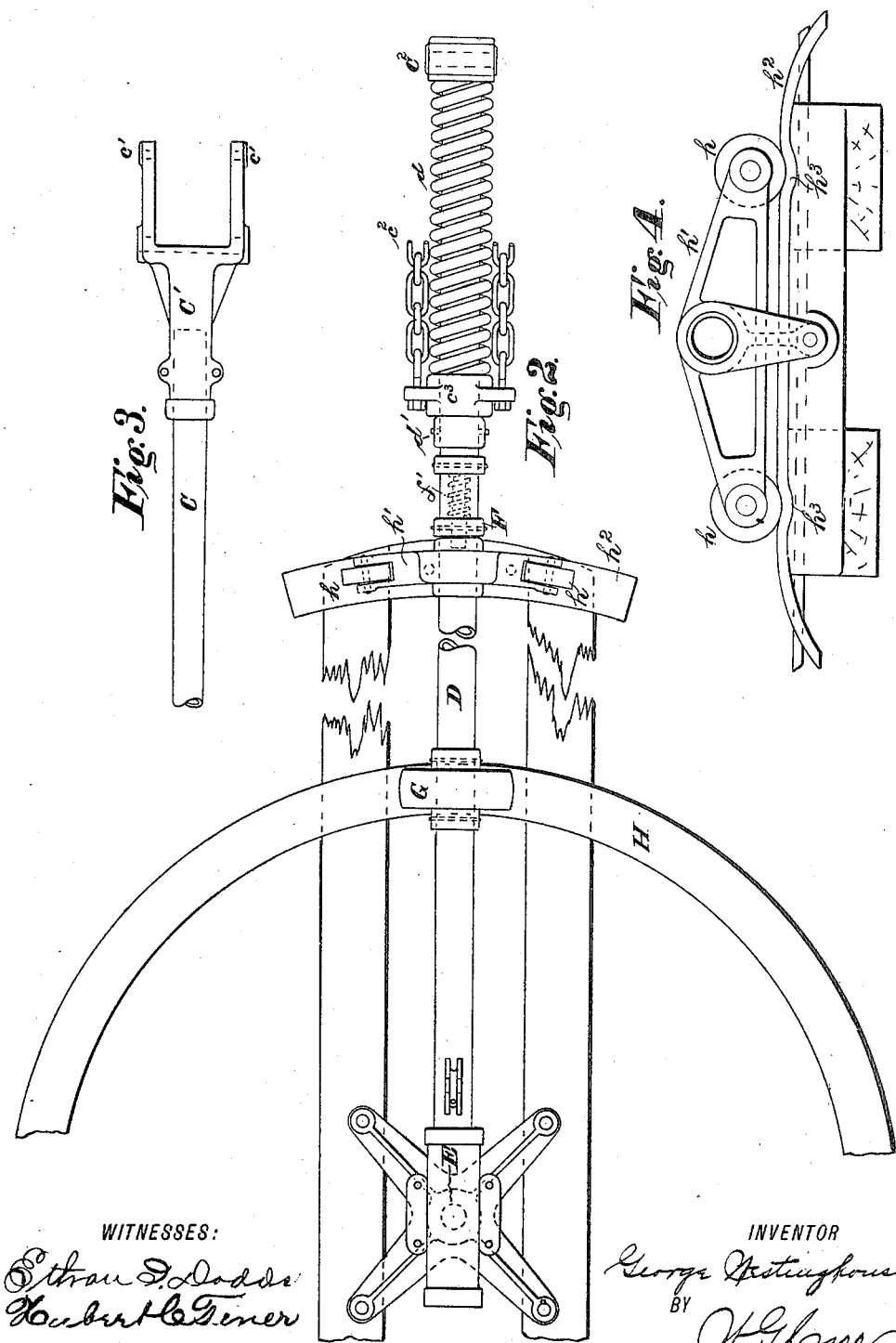

No. 680,824. Patented Aug. 20, 1901.
G. WESTINGHOUSE.
CONTACT DEVICE FOR ELECTRIC RAILWAYS.
(Application filed Feb. 28, 1896.)
(No Model.) 4 Sheets—Sheet 4.
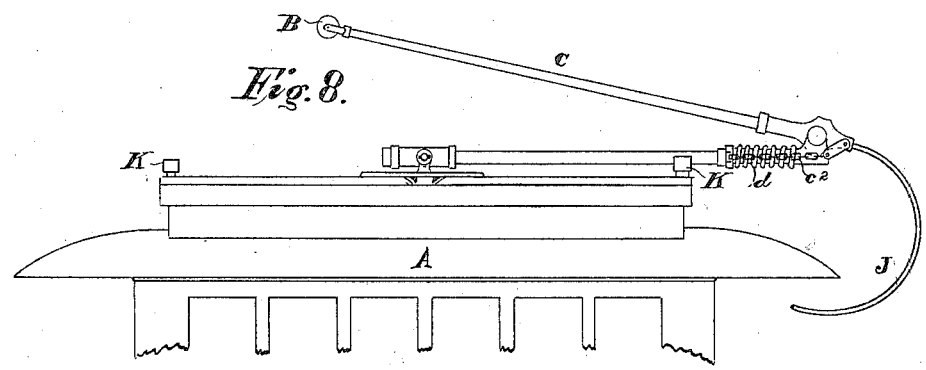
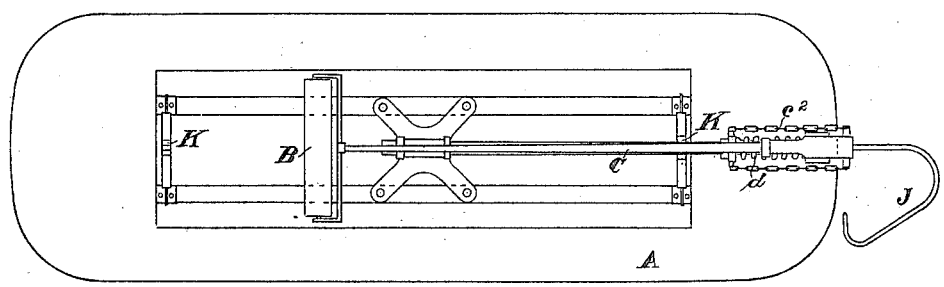
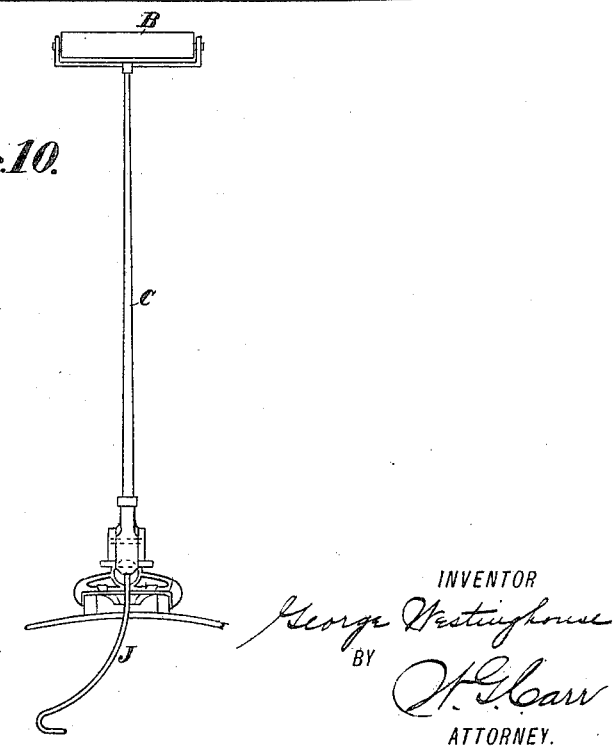
WITNESSES:
Ethan D. Dodds
Hubert C. Tener
INVENTOR
George Westinghouse
BY
H. G. Carr
ATTORNEY.

United States Patent Office.

GEORGE WESTINGHOUSE, OF PITTSBURG, PENNSYLVANIA, ASSIGNOR TO WESTINGHOUSE ELECTRIC AND MANUFACTURING COMPANY, OF SAME PLACE.

CONTACT DEVICE FOR ELECTRIC RAILWAYS.

SPECIFICATION forming part of Letters Patent No. 680,824, dated August 20, 1901.

Application filed February 28, 1896. Serial No. 581,147. (No model.)

*To all whom it may concern:*

Be it known that I, GEORGE WESTINGHOUSE, a citizen of the United States, residing in Pittsburg, in the county of Allegheny and State of Pennsylvania, have invented a new and useful Improvement in Contact Devices for Electric Railways, of which the following is a specification.

The invention relates to the class of devices employed for making traveling contact with electric conductors through which current is supplied to moving electrically-propelled vehicles.

The invention involves the employment of an extended contact device—such, for instance, as a cylindrical tube or roller supported in a suitable manner above the car in contact with the under side of the overhead conductor. The cylindrical tube or roller is of such a length that some portion of it will usually remain in contact with the conductor. For the purpose of employing as short a tube or roller as practicable, and yet insure that the contact device shall not escape from the conductor, non-revoluble lateral extensions may be provided at the respective ends of the roller. The extensions may be replaceable; but inasmuch as the contact device is for the most part with the roller and the conductor is in contact with the extensions only at intervals the wear upon them will not be excessive.

The invention involves certain other details, which will be pointed out in connection with the drawings.

In the accompanying drawings, Figure 1 is a side elevation, partly in section, of the contact device and its support. Fig. 2 is a plan view of the reversible support. Figs. 3 and 4 illustrate certain details in the construction thereof. Fig. 5 is a detail of one form of contact device. Figs. 6 and 7 illustrate modifications. Figs. 8, 9, and 10 illustrate modifications in the form of reversing support.

Referring to the figures, A represents the top of an electric car, and B the contact device. This contact device is carried upon a pole or support C, the lower end of which is secured in a socket $C'$. This socket is hinged upon a bracket $C^2$, carried at the end of a reversible boom D, which is pivoted at the center of the car, as shown at E. The lower end of the socket $C'$ is provided with extensions $c'$, to which are secured chains $c^2$, extending to a movable collar $c^3$, surrounding the boom. A spring $d$ is compressed between the bracket $C^2$ and the collar $c^3$, the latter being held by a fixed collar or stop $d'$. A cord $e$ extends from a point near the upper end of the arm or pole C under the pulley $e'$ along the boom D and, if desired, within it and at the outer end of the boom over a pulley $e^2$ and into convenient position to be reached by the motorman. By means of this cord the pole C, with its contact device B, may be drawn downward against the pressure of the spring $d$. The boom D is locked in position at one end of the car or the other by means of a bolt $f$ passing through a casting F upon the boom and pressed by a spring $f'$ into engagement with a socket $f^2$, one of these sockets being fastened at each end of the car. A cord $e^3$, which may be a continuation of the cord $e$, is fastened to the bolt $f$ for the purpose of withdrawing the bolt. A supporting-wheel G is carried by the boom at any suitable point, and it rests upon a circular bracket or ring H for aiding in the support of the boom when it is being reversed. Friction-rollers $h\ h$ may also be provided near the outer end of the boom, these being carried in a bracket $h'$, as shown particularly in Fig. 4. When the boom comes to position to be locked, the rollers $h$ run upon a short plate $h^2$, provided with depressions, as shown at $h^3$, for receiving the rollers. These rollers serve to steady the boom against rocking, as well as to aid in guiding it into its locking position. The pole C may be of such length as to normally bring the contact device B not far from the center of the car, or at least not far behind the rear wheels. If the contact device be so placed as to be above the center of the car, its central portion should remain in contact with a centrally-placed overhead conductor at all times, even when passing around curves. In some cases, however, it is more convenient to employ a boom of shorter length, and to thus carry the contact device B somewhat toward the rear end of the car, in which case it may be desirable to adjust the overhead conductor correspondingly toward the outer rail of the track at the curves, it being desirable that the central portion of the contact device shall be in contact with the conductor in turning a curve. In locating the conductor at curves the particular factors to be considered are the length of the pole, the height of the conductor, and the radius of the curve.

In Figs. 8 and 9 I have illustrated a modified form of device for manipulating the reversing-boom. In this instance I have shown a rigid handle J, extending from the lower end of the arm C into convenient position for the motorman to reach. The arm is curved to one side, as shown in Figs. 9 and 10. By means of this arm the boom may be lifted from a socket K at one end of the car and swung around to a similar socket at the other end. In this instance I have illustrated a cylindrical contact-roller for convenience; but it will be understood that the form of the contact-roller may be variously modified.

In Fig. 5 I have shown the contact device B as consisting of a central roller $b$, mounted in a fork $b'$, which may be of cast metal, and it is provided with lateral extensions $b^2$, between which the roller $b$ is carried. The roller $b$ is provided with suitable bearings at each end and also, if desired, at the middle, and a spindle or shaft $b^3$ extends completely through it and is supported at its respective ends in the casting or fork $b'$. This construction permits of the use of a shorter contact-roller than would be necessary if the entire length of the device were made to rotate.

The extensions may be of various forms. For instance, in Fig. 5 they curve slightly upward, in Fig. 6 they are straight, and in Fig. 7 they incline downward. These extensions may be made removable, so as to be replaced in case they should be broken or become worn, although they will naturally receive but little wear if the adjustment of the overhead conductor is fairly good. I have shown them as bolted to the fork $b'$; but the method of attaching them may be variously modified. In practice I have found that a roller from twelve to sixteen inches in length is sufficient, such roller having extensions varying in length according to the variation of the overhead conductor from a normal position. A roller of this length will ordinarily run in contact with the conductor, the extensions serving to receive the conductor when it is out of its proper alinement.

It will be readily understood that the contact device may be reversed by simply unlocking the boom and swinging it around from one end of the car to the opposite end and there locking it in its opposite position. In cases where it is desired that the boom shall not be of such a length as to project much beyond the side of the car during the reversing operation the boom may be made shorter than the relative proportions indicated in the drawings, and this will result merely in throwing the contact device farther toward the rear end of the car; but, as already stated, the adjustment of the overhead conductor may be made to compensate for the change of position. With a contact device of, say, four feet, or thereabout, in length there may be considerable deviation of the overhead conductor from its proper position without breaking contact.

I claim as my invention—

1. In combination with a reversible boom the supporting-rollers G and $h$ $h$, and their respective track-plates, and a locking device for securing the boom in either of two positions.

2. A contact device for electric railways consisting of a cylindrical roller, a frame carrying the same, an arm or support therefor movable in a vertical plane, a spring tending to lift said support, a horizontal boom carrying the support and pivoted at or near the center of the car-roof, a seat for the boom at each end of the car, wheels carried by the boom and riding upon said seat, and depressions in the seat for receiving the wheels.

3. A contact device for electric railways consisting of a cylindrical roller, a frame or fork by which said roller is supported and removable lateral extensions constituting continuations of the contact-surface of said roller.

4. A contact device for electric railways consisting of a cylindrical roller, a cast-metal fork between the arms of which said roller is carried, a shaft extending through the roller and journaled in the arms of said fork and removable extension-pieces constituting prolonged contact-surfaces, substantially as and for the purposes described.

In testimony whereof I have hereunto subscribed my name this 26th day of February, A. D. 1896.

GEO. WESTINGHOUSE.

Witnesses:
PH. FERD KOBBÉ,
CHARLES A. TERRY.